United States Patent [19]
Tom et al.

[11] Patent Number: 5,625,365
[45] Date of Patent: Apr. 29, 1997

[54] DUAL-FREQUENCY MICROWAVE RADIO ANTENNA SYSTEM

[75] Inventors: Paul K. W. Tom, Saratoga; Valentine L. Denninger, Sunnyvale, both of Calif.

[73] Assignee: Trimble Navigation Limited, Sunnyvale, Calif.

[21] Appl. No.: 402,194

[22] Filed: Mar. 10, 1995

[51] Int. Cl.$^6$ .................. H01Q 1/38; H01Q 1/42
[52] U.S. Cl. ............... 343/700 MS; 343/701; 343/872
[58] Field of Search ............ 343/700 MS, 893, 343/872, 725, 729, 701; H01Q 1/38, 1/42

[56] References Cited

U.S. PATENT DOCUMENTS

| | | | |
|---|---|---|---|
| 4,914,448 | 4/1990 | Otsuka et al. | 343/700 MS |
| 5,243,358 | 9/1993 | Sanford et al. | 343/700 MS |
| 5,406,294 | 4/1995 | Silvey et al. | 343/782 |

FOREIGN PATENT DOCUMENTS

| | | | |
|---|---|---|---|
| 5-83022 | 4/1993 | Japan | H01Q 1/42 |
| 6-140823 | 5/1994 | Japan | H01Q 1/42 |

*Primary Examiner*—Hoanganh T. Le
*Attorney, Agent, or Firm*—Thomas E. Schatzel; Law Offices of Thomas E. Schatzel A Prof. Corporation

[57] ABSTRACT

An antenna system for a navigation satellite receiver tuned to dual-frequency transmissions from orbiting navigation satellites. Respective L1 and L2 microwave patch antennas are mounted flat and adjacent to one another on a common ceramic substrate and have their centers grounded to a groundplane on the opposite side of the substrate with vias. Each patch antenna is connected to a respective near-by low-noise amplifier. The low-noise amplifiers are both connected to a signal combiner and a final radio frequency amplifier for down feed to a navigation satellite receiver. A direct current signal from the navigation satellite receiver is used on the down-feed to selectively control which one of the two low-noise amplifiers is to operate. Thus one coaxial down-feed supplies power to the low-noise amplifiers and provides for the selection between the L1 and L2 carrier frequencies on the down-feed.

10 Claims, 3 Drawing Sheets

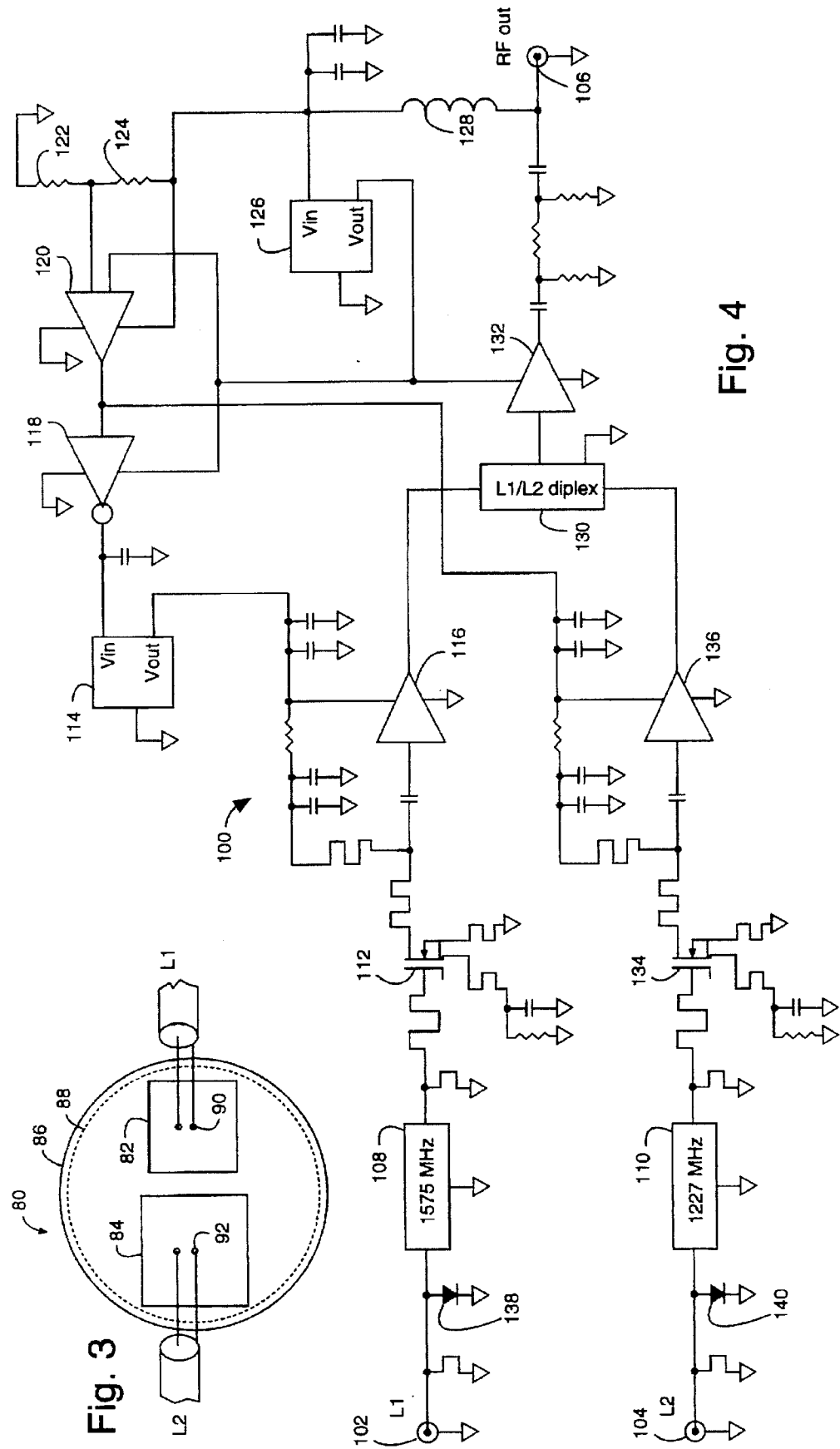

DUAL-FREQUENCY MICROWAVE RADIO ANTENNA SYSTEM

BACKGROUND OF THE INVENTION

1. Field of the Invention

The invention relates generally to radio communication and more specifically to dual-frequency microwave antenna systems that operate with signals received from orbiting navigation satellites.

2. Description of the Prior Art

The global positioning system (GPS) supported by the United States government enables satellite navigation for military and civilian users alike. Two codes, a coarse-grained acquisition code (C/A-code) and a fine-grained precision code (P-code) are transmitted on two L-band microwave frequencies, e.g., L1 on 1575.42 MHz and L2 on 1227.6 MHz, and each provide ranging and GPS-system time information. The C/A-code is available to civilian users and the P-code is available primarily to authorized users. During certain periods, the P-code is encrypted and such encrypted P-code is referred to as Y-code. The C/A-code is a digital sequence that repeats each millisecond and is unique to one of two dozen satellites. The P-code is a digital sequence that has a period of 269 days, with one week long segments of it transmitted intact. Which segment is being sent in any one week is classified. A single week-long segment is $10.23 \times 10^6 \times 604800$ bits long, which comes from the P-code transmission rate of 10.23 MHz times the exact number of seconds in seven whole days. So a code phase uncertainty of even ±1 second can call for a search through 20,460,000 chips.

The L1 and L2 carrier frequencies are sufficiently separated in the radio spectrum as to require separate antennas for their reception. Microwave patch antennas to receive L-band radio transmissions are conventional and comprise a rectangular conductive foil on a flat ceramic substrate. With a center feed, such antennas behave as two dipole antennas set at right angles. With a square conductive foil, the two dipole antennas will have the same frequency response. With a rectangular conductive foil, the two dipole antennas will have different frequency responses, depending on the respective lengths of the sides of the rectangle formed.

Prior art dual-frequency GPS antennas include a stacked array, where two microwave patch antennas, one for L1 and one for L2, are stacked one in front of the another, with their respective planes in parallel. A single down-feed is connected to a conventional navigation satellite receiver.

Authorized GPS users need to be able to switch between receiving the L1 and L2 carrier frequencies. Acquisition of the P-code on the L2 carrier often requires first bootstrapping through the C/A-code on the L1 carrier frequency. Sometimes jamming or spoofing will be present on one of the carrier frequencies but not the other. Some receivers need to peak at the other carrier frequency briefly to measure the automatic gain control (AGC) voltage of the intermediate amplifier.

SUMMARY OF THE PRESENT INVENTION

It is therefore an object of the present invention to provide a dual-frequency microwave patch antenna system for a navigation satellite receiver.

It is a further object of the present invention to provide a dual-frequency microwave patch antenna system that can be selectively controlled by a navigation satellite receiver to down-feed one of two received carrier frequencies.

It is another object of the present invention to provide a mechanically rugged dual-frequency microwave patch antenna system.

It is an object of the present invention to provide an EMP-survivable dual-frequency microwave patch antenna system.

Briefly, an embodiment of the present invention comprises respective L1 and L2 microwave patch antennas that are mounted flat and adjacent to one another on a common ceramic substrate and have their centers grounded to a groundplane on the opposite side of the substrate with vias. Each patch antenna is connected to a respective near-by low-noise amplifier. The low-noise amplifiers are both connected to a signal combiner and a final radio frequency amplifier for down feed to a navigation satellite receiver. A direct current signal from the navigation satellite receiver is used on the down-feed to selectively control which one of the two low-noise amplifiers is to operate. Thus one coaxial down-feed supplies power to the low-noise amplifiers and provides for the selection between the L1 and L2 carrier frequencies on the down-feed.

An advantage of the present invention is that a dual-frequency microwave patch antenna system is provided for a navigation satellite receiver.

Another advantage of the present invention is that a dual-frequency microwave patch antenna system is provided that can be selectively controlled by a navigation satellite receiver to down-feed one of two received carrier frequencies.

A further advantage of the present invention is that a mechanically-rugged dual-frequency microwave patch antenna system is provided.

Another advantage of the present invention is that an EMP-survivable dual-frequency microwave patch antenna system is provided.

These and other objects and advantages of the present invention will no doubt become obvious to those of ordinary skill in the art after having read the following detailed description of the preferred embodiment which is illustrated in the drawing figures.

IN THE DRAWINGS

FIG. 3 is a plan view of a dual-frequency microwave antenna used in the assemblies of FIGS. 1 and 2;

FIG. 4 is a schematic diagram of a dual-frequency low-noise amplifier for the antennas of FIGS. 1-3;

DETAILED DESCRIPTION OF THE PREFERRED EMBODIMENT

Figure 1:
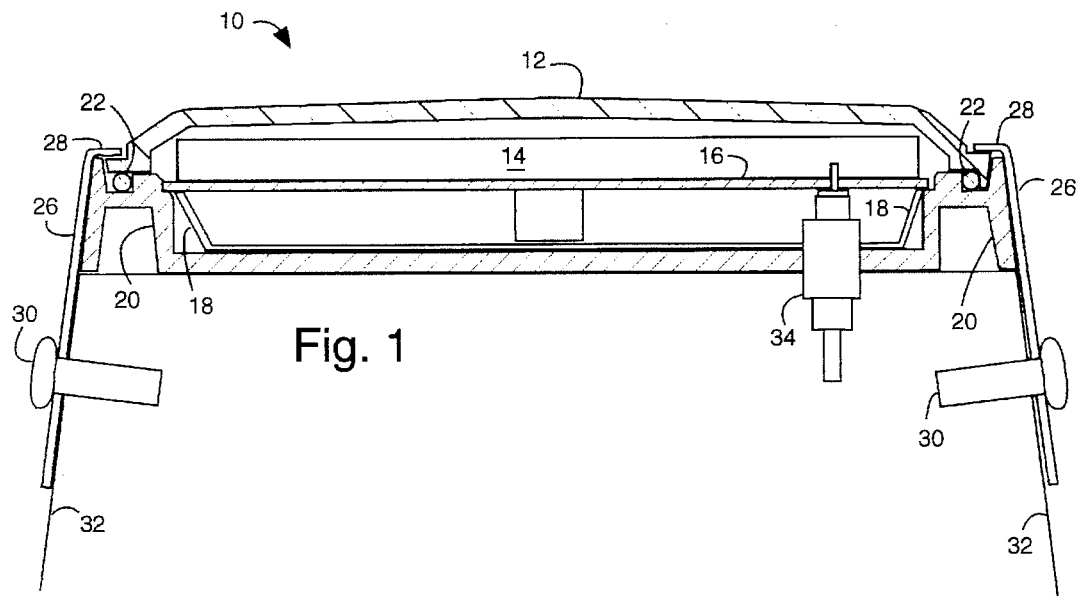
FIG. 1 is a cross-sectional view of a conical mount antenna assembly embodiment of the present invention.

FIG. 1 illustrates a cross-section of a conical mount antenna assembly embodiment of the present invention, referred to herein by the general reference numeral 10. The conical-mount antenna assembly 10 comprises a molded-plastic radome 12, an antenna 14 on a ground plate 16, a metal shield can 18 for antenna electronics such as a low-noise amplifier, a die-cast base 20, an O-ring 22 to seal out weather, a metal hold-down ring 26 with a rolled edge 28 to retain the radome 12, and a pair of fasteners 30 to attach the antenna assembly 10 to a cone 32. The metal shield can 18 is a bucket enclosure that is sealed along its rim to the ground plate 16. The cone 32, for example, may be part of the aft section of a gravity bomb guided by navigation satellite signals received by the antenna 14. An RF output connector 34 provides a radio frequency output for a satellite navigation receiver.

Figure 2:
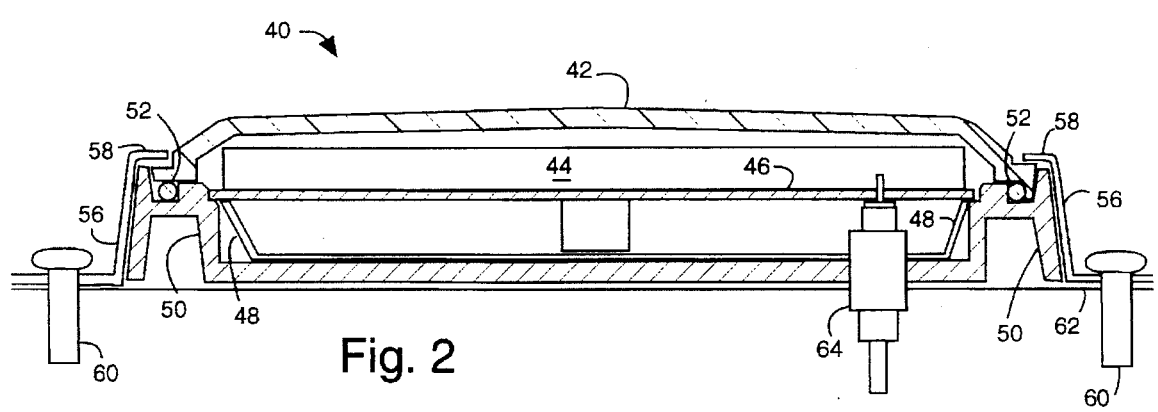
FIG. 2 is a cross-sectional view of a flat surface mount antenna assembly embodiment of the present invention.

FIG. 2 illustrates a cross-section of flat-mount antenna assembly embodiment of the present invention, referred to herein by the general reference numeral 40. The conical-mount antenna assembly 40 comprises a molded-plastic radome 42, an antenna 44 on a ground plate 46, a metal shield can 48 for antenna electronics such as a low-noise amplifier, a die-cast base 50, an O-ring 52 to seal out weather, a formed hold-down ring 56 with a rolled edge 58 to retain the radome 42, and a pair of fasteners 60 to attach the antenna assembly 40 to a flat surface 62. The flat surface 62, for example, may be part of a top surface of a cruise missile guided by navigation satellite signals received by the antenna 44. An RF output connector 64 provides a radio frequency output for a satellite navigation receiver. During the casting of the base 50, an insert is preferably used to allow different RF output connector options.

Hold-down rings 26 and 56 can additionally serve as drill templates and gusset plates. Ideally, the rings 26 and/or 56 are configured for a variety of mounting surfaces and applications. The materials chosen for the rings 26 and 56 are preferably selected for their abilities to withstand corrosion, e.g., stainless steel, aluminum and plastic.

Antennas 14 and 44 are preferably dual-frequency microwave patch antennas.

FIG. 3 illustrates a dual-frequency microwave patch antenna 80 comprising a square conductive patch 82 for receiving L1-carrier frequencies (1575 MHz) and another, larger square conductive patch 84 for receiving L2-carrier frequencies (1227 MHz) both on a round substrate 86, e.g., ceramic or other dielectric material with a dielectric coefficient in excess of ten. The operational bandwidth of each patch 82 and 84 is fifty MHz. Coaxial feed-wires can be attached to each patch 82 and 84 with the jacket connected to the center of the respective patch 82 and 84 and the center wire connected off-center, in order to obtain an impedance match. In a preferred embodiment, the substrate 86 is 9.3 centimeters (cm) in diameter, the L1-patch 82 is 3.1 cm square, and the L2-patch 84 is 3.8 cm square. The patches 82 and 84 are separated by an air gap of 0.8 cm. The centers of each patch 82 and 84 are connected to a single groundplane 88 on the opposite of the ceramic substrate 86 with a pair of plated through-holes (vias) 90 and 92.

In a low manufacturing cost embodiment, a three-layer FR4-type epoxy-fiberglass printed circuit board (PCB)-is used. The patches 82 and 84 are patterned in one copper clad layer on one surface. A groundplane is sandwiched between dielectric substrates in the middle. The third layer, on the side opposite to the patches 82 and 84, is patterned for a low-noise amplifier assembly. Such construction is preferred in low-cost applications.

FIG. 4 illustrates a low-noise, dual-frequency amplifier 100 for use with the antenna 80. The amplifier 100 selectively amplifies and then passes through either one of the L1 and L2 carrier frequencies respectively received at a pair of input jacks 102 and 104, according to a direct current (DC) voltage signal received at a radio frequency (RF) output jack 106. The preferable signal isolation between the input jacks 102 and 104 is at least eighty decibels. A navigation satellite receiver is typically connected to the RF output jack 106. The input jacks 102 and 104 are respectively connected to the L1 and L2 carrier outputs of the antenna 80, e.g., with coaxial cable. Preferably, the amplifier 100 is constructed on the opposite side of the substrate 86, so that the coaxial cable runs can be kept very short.

A 1575 MHz bandpass filter 108 selectively passes through signals in the L1-carrier frequency range. A 1227 MHz bandpass filter 110 selects signals in the L2-carrier frequency range. A transistor 112 provides a stage of RF amplification for the L1-carrier frequencies, and receives its operating bias and power from a DC regulator 114. An amplifier 116 provides a second stage of amplification for the L1-carrier frequencies and is also powered by the DC regulator 114. The first and second stages of amplification preferably provide thirty-six to forty decibels of gain.

An inverter 118 provides a negated logic level output to the DC regulator 114 from an input voltage received from a comparator 120. A voltage divider comprising resistors 122 and 124 sets the threshold voltage at which the comparator 120 will switch. A second DC regulator 126 provides a constant DC voltage which powers the inverter 118 and that provides a reference voltage input for the comparator 120. A DC voltage signal received on the RF output jack 106 is used to power the amplifier 100 through a RF choke 128. The signal's DC voltage must be high enough to bring the DC regulator 126 into regulation. A higher DC voltage than this will cause the comparator 120 to switch its output low and the output of the inverter 118 will switch high, thus powering the transistor 112 and the amplifier 116. An L1/L2 diplexer 130 passes L1-carrier frequencies from the amplifier 116 to a final RF amplifier 132 for output by the RF output jack 106. When the output of the comparator 120 is high, it powers a transistor 134 and an amplifier 136 that provide first and second stages of L2-carrier frequency amplification. The L2-carrier frequencies are also passed by the L1/L2 diplexer 130 to drive the final RF amplifier 132.

When the antenna 80 and the amplifier 100 are used in applications where large electromagnetic pulses (EMP) are present, e.g., adjacent to radar antennas and/or near neutron bomb explosions, the amplifier 100 preferably includes a pair of diodes 138 and 140. Continuous electromagnetic fields as great as two hundred volts per meter can thus be tolerated.

Figure 5:
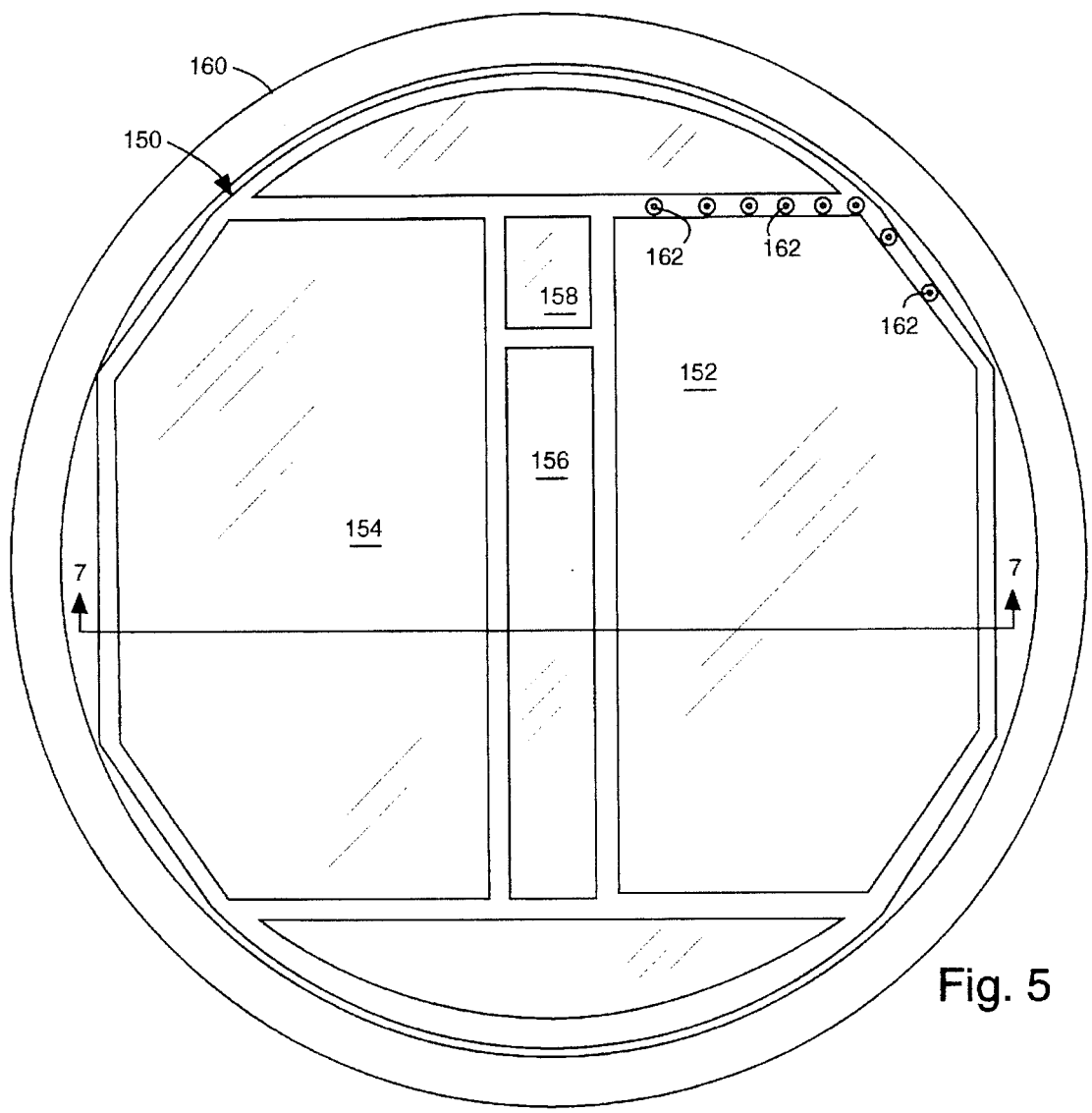
FIG. 5 is a plan view of an alternative die-cast base collared by a mounting ring.

FIG. 5 shows an alternative embodiment of a die-cast base 150, similar to bases 20 and 50 in FIGS. 1 and 2, that has an L1-LNA compartment 152, an L2-LNA compartment 154, an RF final compartment 156 and an RF output connector compartment 158. A mounting ring 160 collars the die-cast base 150, and is similar to rings 26 and 56 in FIGS. 1 and 2. A series of rib spikes 162 protrude from the top rims of the ribs which separate and enclose the compartments 152, 154, 156 and 158.

Figure 6:
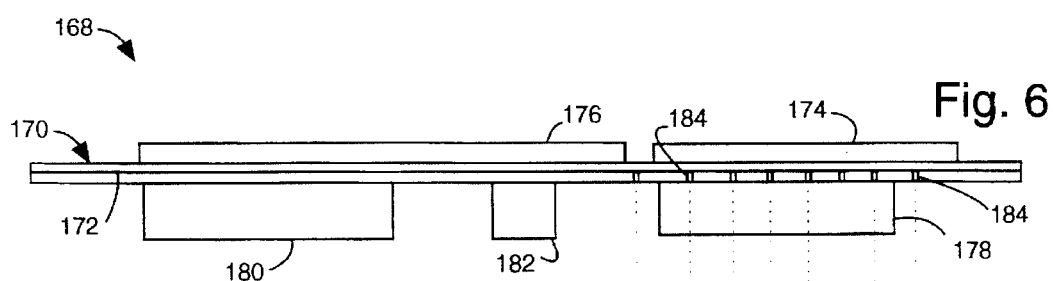
FIG. 6 is an end view of an antenna and amplifier combination constructed on a printed circuit board.

FIG. 6 illustrates an antenna and amplifier combination 168 comprising a three-layer FR4 epoxy-fiberglass printed circuit board (PCB) 170 with an internal groundplane layer 172 insulated from an L1-patch 174, an L2-patch 176, an L1-low noise amplifier (LNA) 178, an L2-LNA 180 and an RF final amplifier 182. For example, the L1-LNA 178 includes the filter 108, the transistor 112 and the amplifier 116 of FIG. 4. The L2-LNA 180 includes the filter 110, the transistor 134 and the amplifier 136 of FIG. 4. The RF final amplifier 182 includes the L1/L2 diplexer 130 and the amplifier 132 of FIG. 4. A series of plated-through holes which connect to the internal groundplane 172 are positioned to mechanically engage and electrically contact the rib spikes 162, and thus complete an electrical box shield for the L1-LNA 178, the L2-LNA 180 and the RF final amplifier 182.

Figure 7:
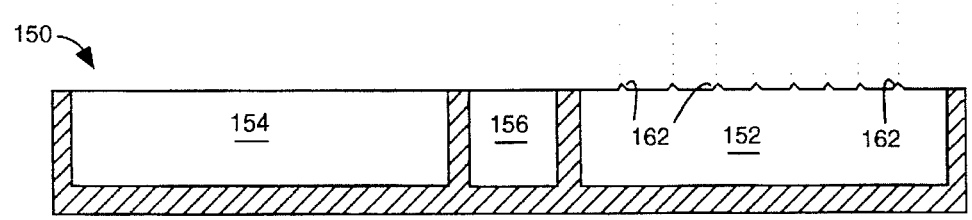
FIG. 7 is a cross-sectional view of the die-cast base of FIG. 5 taken along the line 7—7.

FIG. 7 shows a cross-sectional view of the die-cast base 150 and indicates how the spikes 162 engage the holes 184 in the PCB 170 (FIG. 6).

Although the present invention has been described in terms of the presently preferred embodiment, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A dual-frequency antenna system, comprising:

a first rectangular planar microwave patch antenna mounted to a substrate and particularly dimensioned for receiving radio transmissions from orbiting navigation satellites on a first carrier frequency;

a second rectangular planar microwave patch antenna mounted to said substrate and particularly dimensioned and larger than the first rectangular planar microwave patch antenna for receiving radio transmissions from orbiting navigation satellites on a second different carrier frequency and positioned adjacent to and in the same plane as the first rectangular planar microwave patch antenna; and a dual-frequency radio frequency amplifier having a first input and a second input respectively connected to the first and second rectangular planar microwave patch antennas and having selective amplification means for selectively amplifying one of said first and second frequencies through to a radio frequency output connection.

2. The antenna system of claim 1, further comprising:

power supply means connected to said radio frequency output connection for extracting a direct current power source to power the RF amplifier.

3. The antenna system of claim 1, wherein:

said selective amplification means in the RF amplifier comprises at least one stage of first-frequency amplification and at least one stage of second-frequency amplification each connected to diplexing means and a final stage of RF amplification for both said first and second frequencies.

4. The antenna system of claim 2, wherein:

said selective amplification means in the RF amplifier comprises at least one stage of first-frequency amplification and at least one stage of second-frequency amplification each connected to diplexing means and a final stage of RF amplification for both said first and second frequencies, and a voltage sensing means connected to the power supply means and said first and second frequency amplification stages for alternating operating power between said first and second frequency amplification stages according to a DC voltage signal present on said radio frequency output connection.

5. The antenna system of claim 1, wherein:

the RF amplifier further comprises electromagnetic pulse protection means connected at said first and second inputs for limiting a pulse voltage received from the first and second rectangular planar microwave patch antennas.

6. The antenna system of claim 1, further comprising:

a molded-plastic radome for passing through said radio signal transmissions from said orbiting navigation satellites;

a die-cast base;

a dual-frequency microwave antenna system enclosed by the base and the radome and including the first rectangular planar microwave patch antenna and the second rectangular planar microwave patch antenna;

an O-ring seal positioned between an outside edge of the radome and the base outside of the perimeter of the antenna system for excluding weather from within the antenna assembly; and a metal hold-down ring to collar the base and having a rolled edge to retain the radome with the O-ring in compression.

7. An antenna assembly, comprising:

a molded-plastic radome for passing through microwave radio signal transmissions from an orbiting navigation satellite and for excluding the weather;

a die-cast base;

a dual-frequency microwave antenna having a separate patch antenna element for each of two separate frequencies enclosed by the base and the radome;

an O-ring seal positioned between an outside edge of the radome and the base outside of the perimeter of the antenna for excluding weather from within the antenna assembly; and a metal hold-down ring to collar the base and having a rolled edge to retain the radome with the O-ring in compression.

8. The antenna assembly of claim 7, wherein:

the die-cast base includes raised ribs to separate and enclose compartments to shield electronic circuits connected to the antenna.

9. The antenna assembly of claim 7, further comprising:

a groundplane positioned behind the antenna and within the die-cast base;

at least one raised rib to separate and enclose at least one compartment providing for shielding electronic circuits connected to the antenna; and a series of spikes disposed on at least one raised rib to mechanically engage and electrically contact the groundplane.

10. An antenna assembly, comprising:

a molded-plastic radome for passing through microwave radio signal transmissions from an orbiting navigation satellite and for excluding the weather;

a die-cast base;

a microwave antenna enclosed by the base and the radome;

an O-ring seal positioned between an outside edge of the radome and the base outside of the perimeter of the antenna and for excluding weather from within the antenna assembly;

a metal hold-down ring to collar the base and having a rolled edge to retain the radome with the O-ring in compression;

a groundplane positioned behind the antenna and within the die-cast base;

at least one raised rib to separate and enclose at least one compartment providing for shielding electronic circuits connected to the antenna; and a series of spikes disposed on at least one raised rib to mechanically engage and electrically contact the groundplane.

* * * * *